Oct. 13, 1959     H. E. WATSON     2,908,412
BOAT TRAILER
Filed Dec. 26, 1957     2 Sheets-Sheet 1
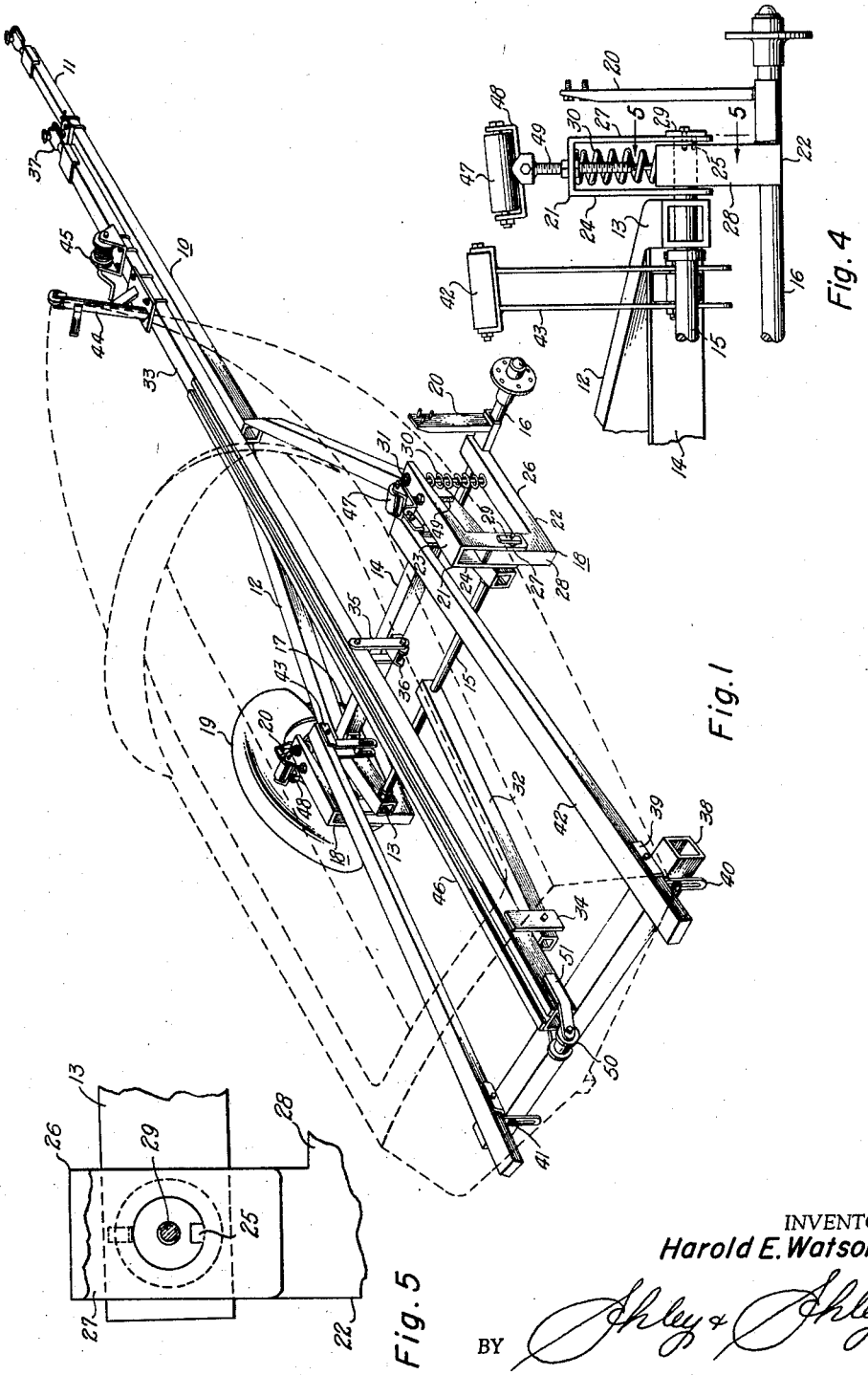
INVENTOR
Harold E. Watson
BY
ATTORNEYS Oct. 13, 1959  H. E. WATSON  2,908,412
BOAT TRAILER
Filed Dec. 26, 1957
2 Sheets-Sheet 2
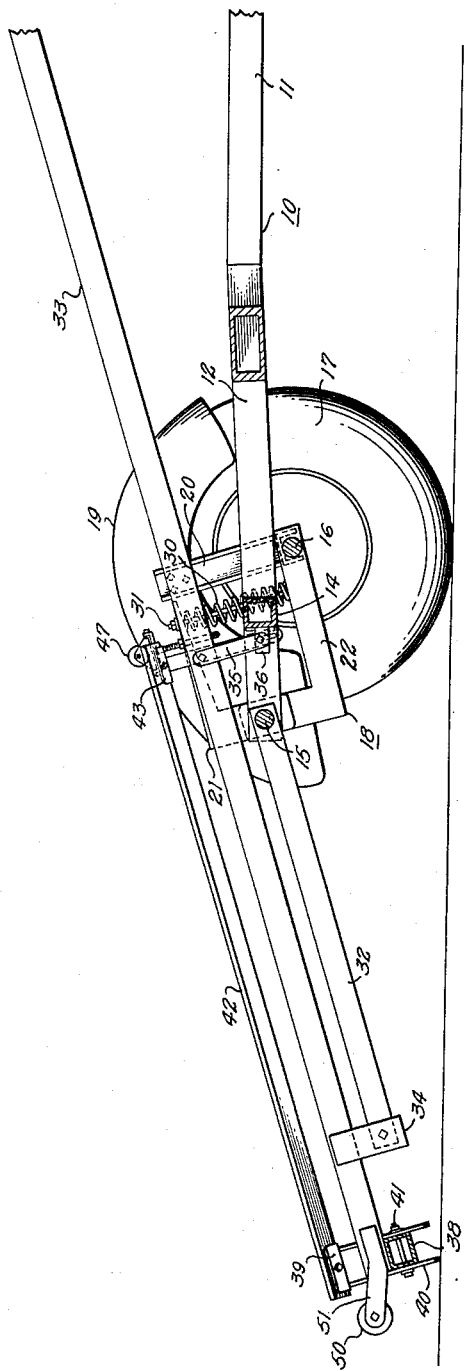
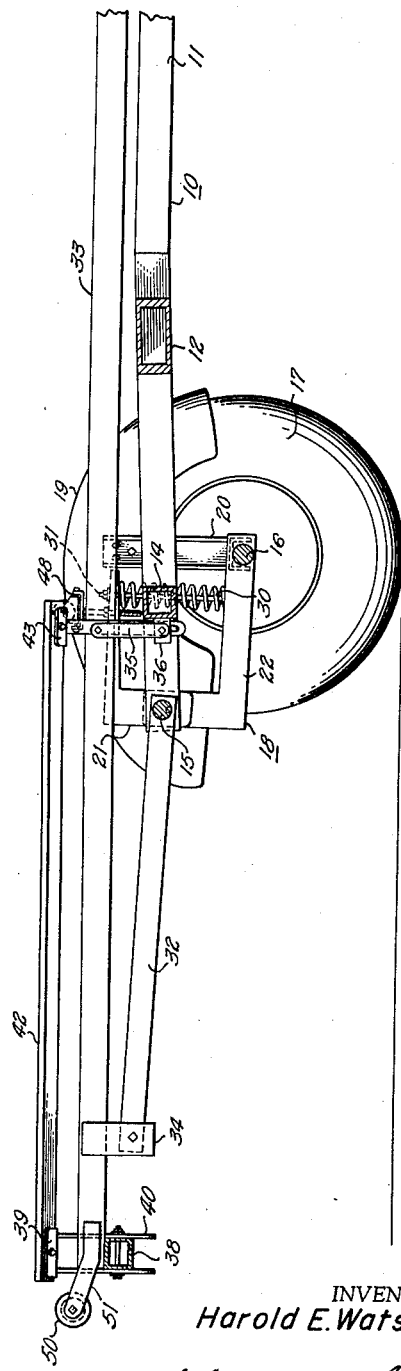
INVENTOR
Harold E. Watson
BY Ashley & Ashley
ATTORNEYS

United States Patent Office 2,908,412
Patented Oct. 13, 1959

2,908,412

BOAT TRAILER

Harold E. Watson, Dallas, Tex.

Application December 26, 1957, Serial No. 705,379

9 Claims. (Cl. 214—506)

This invention relates to new and useful improvements in trailers for boats.

One object of the invention is to provide an improved trailer having a tilting carriage of such construction and arrangement that loading and unloading of a boat is facilitated.

Another object of the invention is to provide an improved boat trailer having a carriage pivotally mounted on a frame for tilting movement and means for pivotally connecting the carriage and frame to a supporting axle whereby the frame is lowered upon tilting of said carriage so as to position the tilted carriage closer to the ground.

An important object of the invention is to provide an improved boat trailer, of the character described, having means carried by the axle so as to be positioned for engagement with the hull of the boat upon lowering of the frame and tilting of the carriage whereby the boat may be more readily slid off of and onto said carriage.

A particular object of the invention is to provide an improved boat trailer, of the character described, wherein the axle is disposed forwardly of the pivotal attachment of the carriage to the frame and the pivotal connecting means is attached to said carriage and frame rearwardly of said pivotal attachment whereby the frame is lowered relative to said axle upon rearward tilting of said carriage.

A construction designed to carry out the invention will be hereinafter described, together with other features of the invention.

The invention will be more readily understood from a reading of the following specification and by reference to the accompanying drawings, wherein an example of the invention is shown, and wherein:

Fig. 1 is a perspective view of a trailer, constructed in accordance with the invention, with one of the wheels and fenders removed, Fig. 2 is a longitudinal, vertical, sectional view of the trailer with its carriage in boat supporting position, Fig. 3 is a view, similar to Fig. 2, with the carriage in tilted position, Fig. 4 is an enlarged, rear elevational view showing the pivotal connection of the frame to the axle, and Fig. 5 is a vertical, sectional view, taken on the line 5—5 of Fig. 4.

In the drawings, the numeral 10 designates the frame of a trailer for transporting and launching small boats and includes an elongated, forwardly-extending tongue or longitudinal member 11 and a pair of rearwardly-extending, outwardly diverging legs 12. As shown by the numeral 13, the rear extremity of the frame legs 12 are bent inwardly upon themselves into longitudinal, parallel relationship and are connected by a horizontal, cross bar 14. Rearwardly of the cross bar 14, a horizontal shaft 15 extends transversely between the rear frame extremities 13 and has its end portions journaled in and extending laterally beyond said extremities. An axle 16, having a pair of ground wheels 17, is disposed forwardly of and below the cross bar 14 and is connected to the outwardly projecting ends of the shaft 15 by a pair of hangers 18. If desired, suitable fenders 19 for the wheels 17 may be mounted on brackets 20 upstanding from the axle 16.

Each hanger 18 is substantially C-shaped and includes a pair of angular arms or L-shaped elements 21 and 22. The upper arm has an elongated, substantially horizontal leg or portion 23 with an upright, shorter leg or portion 24 depending from its rear end and keyed or otherwise fixedly secured to the shaft 15 as shown at 25 (Figs. 4 and 5). A leg 26 of the lower arm 22, complementary and parallel to the upper leg 23, has its front end rigidly connected to the axle 16 adjacent the fender bracket 20. Preferably, the depending leg 24 of the upper arm includes a pair of parallel flanges 27 for receiving therebetween a complementary leg 28 upstanding from the rear end of the elongated, lower leg 26 and journaled for rotation on the shaft. A suitable fastener 29 secures the outer flange 27 to the outer end of the shaft.

For maintaining the elongated legs 23 and 26 in substantially parallel relationship and for absorbing road shocks, a helical spring 30 is confined between the front end portions of said legs upon a bolt 31 extending between and connecting said portions. Of course, various types of shock absorbing may be employed in place of the spring 30. Due to the rotatable connection of the lower hanger arm 22 to the shaft 15, the axle 16 may undergo vertical reciprocation relative to the frame 10. Also, as will be explained, the hangers 18 may pivot or rock relative to the frame about the axle to permit lowering and raising of said frame relative to said axle.

For controlling the movement and position of the hangers, a longitudinally-extending tie bar or link 32 has its front end fixed to the medial portion of the shaft 15 and its rear end pivotally connected to the rear end portion of a central, longitudinal carriage member or beam 33. A flat plate or lug 34 depends from each side of the carriage member 33 for pivotally suspending the link 32 beneath said member. The intermediate portion of the carriage member is pivotally connected by a pair of depending links 35 to a bracket or lug 36 which extends rearwardly from the medial portion of the cross bar 14 whereby the pivotal connection of said carriage to the frame is in a vertical plane between the shaft 15 and axle 16. The front end portion of the member 33 overlies and is adapted to be detachably connected to the tongue 11 of the frame by a suitable clamp or fastener 37. When the carriage member is connected to the tongue, it is in substantially parallel relation to the frame and the upper and lower arms 21 and 22 of the hangers 18 are disposed in a substantially horizontal position (Figs. 1 and 2). Upon disconnection and rearward tilting of the carriage member, its rear end is swung downwardly toward the ground and the tie bar or link 32 swings downwardly therewith. Since the shaft 15 is fixed to the front end of the tie bar, said shaft moves downwardly therewith in an arc about the axis of the axle 16 and turns about its own axis as shown in Fig. 3. The hangers pivot with the shaft due to the keying of their upper arms 21 to said shaft and cause lowering of the frame legs 12 into close proximity to the axle. It is pointed out that this lowering of the frame positions the tilted carriage member closer to the ground.

For supporting a boat, such as shown by the broken lines B in Fig. 1, a horizontal cross bar 38 underlies and is secured to the rear end of the member 33. A bracket 39 overlies each outer end portion of the cross bar 38 and is connected thereto for vertical adjustment by a pair of slotted bars 40 and a bolt 41. The brackets 39 are adapted to support the rear ends of hull-engaging members or timbers 42 which have their front ends adjustably connected to the cross bar 14 by similar brackets 43. A conventional bow bumper 44 and wench 45 may be mounted on the front end of the carriage member. Since the carriage member is adapted to be engaged by the keel of the boat, suitable cushion strips 46 may extend longitudinally of said member. For lifting the bow portion of the boat from engagement with the carriage members 33 and 42, a roller 47 upstands from each hanger 18 and is adjustably connected thereto by a trunnion bracket 48 having a depending rod 49 in screw-threaded engagement with the upper leg 23 of the upper hanger element 21. A stern roller 50 is mounted between suitable straps 51 which project longitudinally from the rear end of the carriage member 33. As shown in Fig. 2, the rollers 47 are normally disposed below the hull-engaging members 42; however, the front ends of said members are lowered with the frame so that said rollers project thereabove when the carriage is tilted for coacting with the roller 50 in loading and unloading the boat (Fig. 3).

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A boat trailer including a frame, a longitudinal carriage pivotally attached at its intermediate portion to the frame for rearward tilting movement, a transverse supporting axle, angular hangers extending rearwardly from the axle and having their rear portions pivotally connected to said frame, and tie means having rigid connection with the hangers and pivotal connection with the rear portion of the carriage for rocking said hangers about the axis of said axle to lower said frame upon tilting of said carriage.

2. A boat trailer as set forth in claim 1 including longitudinal boat supporting members connected to the frame and the rear portion of the carriage and tiltable with said carriage, and roller means upstanding from the hangers for extending above the members upon lowering of said frame.

3. A boat trailer as set forth in claim 1 wherein each hanger includes upper and lower substantially parallel arms, the upper arm having rigid connection with the tie means, the lower arm carrying the axle and having pivotal connection with the frame and upper arm, and shock absorbing means interposed between and connecting the arms to permit movement of said axle and lower arm relative to said frame and upper arm.

4. A boat trailer including a frame, a carriage pivotally attached at its intermediate portion to the rear portion of the frame for rearward tilting movement, a supporting axle underlying said frame forwardly of the pivotal attachment of the carriage, hangers for pivotally connecting the axle to said frame rearwardly of said pivotal attachment, each hanger including upper and lower angular elements having longitudinal legs and upright rear legs, the lower element having the front portion of its longitudinal leg connected to said axle and its rear leg upstanding and pivotally connected to said frame and the rear leg of the upper element, the longitudinal leg of said upper element overlying the longitudinal leg of said lower element, shock absorbing means connecting the front portions of said longitudinal legs to permit movement of said axle and lower element relative to said frame and upper element, and a link pivotally connected to the rear portion of said carriage and having rigid connection with the upper hanger elements for rocking said hangers downwardly about the axis of said axle to lower said frame upon rearward tilting of said carriage.

5. A boat trailer as set forth in claim 4 including a shaft extending transversely of the frame for pivotally connecting the upright rear leg of the lower hanger element to said frame and to the rear leg of the upper hanger element and for rigidly connecting the front portion of the link to said rear leg of said upper hanger element.

6. A boat trailer as set forth in claim 4 including boat engaging means upstanding from the frame, and roller means upstanding from the upper hanger elements for extending above the boat engaging means upon lowering of said frame.

7. A boat trailer including a frame, a carriage pivotally attached at its intermediate portion to the frame for rearward tilting movement, a supporting axle forwardly of the pivotal attachment of the carriage to said frame, hanger means extending rearwardly from the axle and having its rear portion pivotally connected to said frame rearwardly of said pivotal attachment, and link means extending rearwardly from the hanger means and having pivotal connection with the rear portion of said carriage for rocking said hanger means about the axis of said axle to lower said frame upon tilting of said carriage.

8. A boat trailer as set forth in claim 7 wherein the hanger means is angular and connected to the frame in offset spaced relation to the axle.

9. A boat trailer as set forth in claim 7 including boat supporting means on the frame and movable therewith, and boat engaging means carried by the hanger means for extending above the boat supporting means upon lowering of said frame.

References Cited in the file of this patent

UNITED STATES PATENTS

| | | |
|---|---|---|
| 2,487,325 | Foster | Nov. 8, 1949 |
| 2,776,769 | McDonald | Jan. 8, 1957 |
| 2,788,908 | Lynd | Apr. 16, 1957 |